United States Patent
Bharti et al.

(10) Patent No.: US 10,824,119 B2
(45) Date of Patent: Nov. 3, 2020

(54) INTELLIGENT ENERGY SWITCH

(71) Applicant: International Business Machines Corporation, Armonk, NY (US)

(72) Inventors: Harish Bharti, Pune (IN); Sanjib Choudhury, Pune (IN); Ravi Kumar V. Mandalika, Bangalore (IN); Abhay K. Patra, Pune (IN); Rajesh K. Saxena, Pune (IN)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 15/083,444

(22) Filed: Mar. 29, 2016

(65) Prior Publication Data

US 2017/0285586 A1  Oct. 5, 2017

(51) Int. Cl.
*G05B 13/02* (2006.01)
*G05B 17/02* (2006.01)
(Continued)

(52) U.S. Cl.
CPC ......... *G05B 13/0265* (2013.01); *G05B 17/02* (2013.01); *G05B 19/10* (2013.01); *G05F 1/66* (2013.01)

(58) Field of Classification Search
CPC .... G05B 13/0265; G05B 17/02; G05B 19/10; G05F 1/66
See application file for complete search history.

(56) References Cited

U.S. PATENT DOCUMENTS 6,674,263 B2  1/2004  Agbossou et al.
7,274,975 B2  9/2007  Miller
(Continued)

FOREIGN PATENT DOCUMENTS

WO   WO2011121535 A2 * 10/2011 ......... G06Q 10/0631

OTHER PUBLICATIONS

D. Logan et al., Modeling Renewable Energy Resources in Integrated Resource Planning, Jun. 1994, National Renewable Energy Laboratory, 114 pages (Year: 1994).*

(Continued)

*Primary Examiner* — Alexey Shmatov
*Assistant Examiner* — Tri T Nguyen
(74) *Attorney, Agent, or Firm* — Schmeiser, Olsen & Watts; Mark C. Vallone

(57) ABSTRACT

A method and associated systems for a self-learning energy switch. The switch creates an array of cognitive models for each candidate energy source. Each array returns a probability that its corresponding source is the most cost-effective and operationally suitable energy supplier at that time. Each model in an array contributes to the array's returned probability as a function of a corresponding class of decision-making factors. The system fine-tunes the models by weighting them as functions of extrinsic evidentiary information that may imply future behavior of the decision-making factors and combines each model's returned probabilities to select an optimal energy source. The system then automatically routes power from the optimal source to a consumer's energy-consuming premises. This self-learning procedure repeats indefinitely, continuously tuning the models in response to identifying additional extrinsic evidence and reasons why the system's previous energy selections were either optimal or non-optimal.

16 Claims, 5 Drawing Sheets

(51) Int. Cl.
*G05B 19/10* (2006.01)
*G05F 1/66* (2006.01)

(56) References Cited

U.S. PATENT DOCUMENTS

| | | | |
|---|---|---|---|
| 7,315,769 B2 | 1/2008 | Balan et al. | |
| 7,657,480 B2 * | 2/2010 | Harper | G06Q 10/06 705/37 |
| 7,953,519 B2 | 5/2011 | Hamilton, II et al. | |
| 8,242,630 B2 | 8/2012 | Tamaki et al. | |
| 8,359,124 B2 | 1/2013 | Zhou et al. | |
| 8,401,711 B2 | 3/2013 | Prengler et al. | |
| 8,543,343 B2 | 9/2013 | Jones et al. | |
| 8,566,266 B2 * | 10/2013 | Nikovski | G05B 13/024 706/46 |
| 8,930,037 B2 | 1/2015 | Brian et al. | |
| 2004/0098142 A1 * | 5/2004 | Warren | F01D 15/10 700/22 |
| 2009/0319090 A1 * | 12/2009 | Dillon | G06Q 10/04 700/291 |
| 2011/0251730 A1 | 10/2011 | Pitt | |
| 2013/0013120 A1 | 1/2013 | Sabripour | |
| 2013/0013233 A1 * | 1/2013 | Murakami | H02J 3/38 702/60 |
| 2013/0079939 A1 * | 3/2013 | Darden, II | H02J 13/0013 700/291 |
| 2014/0019188 A1 * | 1/2014 | Asghari | G06Q 10/06315 705/7.25 |
| 2014/0039710 A1 * | 2/2014 | Carter | G06Q 10/06 700/291 |
| 2014/0088734 A1 * | 3/2014 | Narutani | G05B 19/05 700/28 |
| 2014/0142904 A1 * | 5/2014 | Drees | G06Q 10/04 703/2 |
| 2014/0148963 A1 | 5/2014 | Ozog | |
| 2014/0263261 A1 * | 9/2014 | Hunt | F02N 19/01 219/201 |
| 2016/0195866 A1 * | 7/2016 | Turney | G05B 23/02 700/291 |
| 2016/0275413 A1 * | 9/2016 | Shi | G06N 99/005 |
| 2016/0305678 A1 * | 10/2016 | Pavlovski | G05B 13/048 |
| 2019/0027162 A1 * | 1/2019 | Fukayama | G10L 25/51 |

OTHER PUBLICATIONS

Neeraj Sangal et al., Using Dependency Models to Manage Complex Software Architecture, OOPSLA'05, Oct. 16-20, 2005, 10 pages (Year: 2005).*
Zhao et al., Smart Home Electricity Management in the Context of Local Power Resources and Smart Grid, 7 pages.
Craig Blanch, Hidden cost of rooftop solar: Who should pay for Maintenance, JACOBS, Aug. 26, 2013, 9 pages.
Jill Connors, Can You Afford Solar Power? home (http://www.hgtv.com), 2016 Scripps Networks, LLC., 18 pages.
Bozchalui, et al., Optimal Operation of Residential Energy Hubs in Smart Grids, to Appear in IEEE Transactions on Smart Grid, Accepted Jul. 2012, 12 pages.
Phuangpornpitak et al., Opportunities and Challenges of Integrating Renewable Energy in Smart Grid System, SciVerse Science Direct, Energy Procedia 34 (2013) 282-290.
Al-Ali et al, Smart Home Renewable Energy Management System, ICSGCE 2011: Sep. 27-30, 2011, Chengdu, China, Energy Procedia 12 (2011) 12-126.
Hong-Tzer Yang, Smart Home Energy Management System with Renewable and Storage Energy, Sun, Nov. 8, 2015, 49 pages.

* cited by examiner

INTELLIGENT ENERGY SWITCH

TECHNICAL FIELD

The present invention relates to efficiently switching between renewable and nonrenewable energy sources taking into account the economic life of the switching assets.

BACKGROUND

Residential and commercial energy consumers can now install privately owned power-generation equipment on their own premises. When used efficiently, these alternative or renewable energy sources provide cost-effective, low carbon-footprint power that can reduce consumers' reliance on centralized, grid-based power-generation plants.

The relative costs and benefits of these alternative sources may vary, however, making it difficult to select an optimal power source at any particular time. Wind turbines and solar panels, for example, require the right weather conditions. The fluctuating price of grid power must always be considered when determining whether equipment operation cost (which may be influenced by parameters like weather condition, energy consumption and equipment health condition) and capital/operational expense considerations (such as installation cost, maintenance cost, and depreciation cost) of a privately owned renewable energy source make it an economically attractive solution.

Many other factors must be taken into consideration when selecting an energy source and its method of operation, such as amortizable startup costs, the existence of government subsidies, incentives from a utility company for usage of low-carbon-footprint, "green" energy, and Peak Load reduction, and a consumer's power-usage patterns, as well as depreciation expenses, switching costs, maintenance considerations, and equipment life expectancies. Furthermore, at least some of these factors may change abruptly at any time, or even vary continuously over the course of a day, and a selection of which factors to consider (and the relative importance of each selected factor) may be different for each type of energy source at a given time. It is thus exceedingly difficult for a consumer to ensure that he or she has chosen an optimal energy source, whether that source is a public-utility grid or a privately operated like solar or wind power, at any particular time.

Equipment vendors, such as solar-panel installers, sometimes address this problem with simple comparison charts that try to predict relative costs of alternative power sources. But such solutions cannot consider more nuanced consumer-specific characteristics, account for the real-time, continuous variations in energy costs, determine which factors are most relevant when comparing a particular pair of options, or infer future costs from historical records.

Solutions that have incorporated sophisticated mathematical methods and models to forecast and compare energy costs have also failed to provide comprehensive, nuanced analyses. Methods based on stochastic models, for example, can generally consider only independent variables, and thus fail to account for dependencies and other relationships among factors that determine energy costs and a choice of an optimal energy source. Game-theory models, which require a fixed number of variables, lack the flexibility to consider different combinations of factors when comparing different types of energy sources. Probability-based linear and multivariate methods in practice do not consider dynamic relationships among variables, generally produce distribution models that do not account for uncertainties, and lack the ability to self-learn. Even mathematical methods that incorporate decision-tree directed graphs or computations of weighted averages generally fail to take into account the dynamic relationships among variables and do not integrate historic data into a predictive cost analysis.

There is thus no integrated framework that helps a consumer to select optimal energy sources at all times by considering a comprehensive selection of current and future factors in aggregate, tailored to an energy consumer's specific resources. Nor is there such a framework that can self-learn in order to provide increasingly accurate forecasts over time.

BRIEF SUMMARY

A first embodiment of the present invention provides an intelligent energy-switch system comprising a processor, a memory coupled to the processor, an electronically controlled power-switching device, and a computer-readable hardware storage device coupled to the processor, the storage device containing program code configured to be run by the processor via the memory to implement a method for an intelligent energy switch, the method comprising:

the system constructing an array of cognitive models for a first energy source of a set of energy sources, where each model of the array is constructed as a function of a corresponding subset of a set of factors that affect a cost-effectiveness of the first energy source;

the system receiving empirical evidence that is likely to alter an effect of the set of factors upon the cost-effectiveness of the first energy source;

the system automatically adjusting the array of cognitive models as a function of the received evidence;

the system computing a first likelihood that the first energy source is an optimal source of the set of energy sources, where an optimal energy source is able to supply energy more cost-effectively than can any other source of the set of energy sources under current operating conditions;

the system further computing similar likelihoods for other sources of the set of energy sources, where the further computing is performed through steps analogous to the constructing, the receiving, the automatically adjusting, and the computing a first likelihood; and the system selecting an optimal energy source of the set of energy sources as a function of the first likelihood and of the similar likelihoods.

A second embodiment of the present invention provides a method for an intelligent energy switch, the method comprising:

a processor of a computer system constructing an array of cognitive models for a first energy source of a set of energy sources, where each model of the array is constructed as a function of a corresponding subset of a set of factors that affect a cost-effectiveness of the first energy source;

the processor receiving empirical evidence that is likely to alter an effect of the set of factors upon the cost-effectiveness of the first energy source;

the processor automatically adjusting the array of cognitive models as a function of the received evidence;

the processor computing a first likelihood that the first energy source is an optimal source of the set of energy sources, where an optimal energy source is able to supply energy more cost-effectively than can any other source of the set of energy sources under current operating conditions;

the processor further computing similar likelihoods for other sources of the set of energy sources, where the further computing is performed through steps analogous to the constructing, the receiving, the automatically adjusting, and the computing a first likelihood;

the processor selecting an optimal energy source of the set of energy sources as a function of the first likelihood and of the similar likelihoods; and the processor, upon receiving additional empirical evidence, repeating the automatically adjusting, the computing a first likelihood, the further computing similar likelihoods, and the selecting, wherein the repeated selecting selects a current optimal energy source of the set of energy sources as a further function of the additional empirical evidence.

A third embodiment of the present invention provides a computer program product, comprising a computer-readable hardware storage device having a computer-readable program code stored therein, the program code configured to be executed by an intelligent energy-switching system comprising a processor, a memory coupled to the processor, an electronically controlled power-switching device, and a computer-readable hardware storage device coupled to the processor, the storage device containing program code configured to be run by the processor via the memory to implement a method for an intelligent energy switch, the method comprising:

the processor constructing an array of cognitive models for a first energy source of a set of energy sources, where each model of the array is constructed as a function of a corresponding subset of a set of factors that affect a cost-effectiveness of the first energy source;

the processor receiving empirical evidence that is likely to alter an effect of the set of factors upon the cost-effectiveness of the first energy source;

the processor automatically adjusting the array of cognitive models as a function of the received evidence;

the processor computing a first likelihood that the first energy source is an optimal source of the set of energy sources, where an optimal energy source is able to supply energy more cost-effectively than can any other source of the set of energy sources under current operating conditions;

the processor further computing similar likelihoods for other sources of the set of energy sources, where the further computing is performed through steps analogous to the constructing, the receiving, the automatically adjusting, and the computing a first likelihood;

the processor selecting an optimal energy source of the set of energy sources as a function of the first likelihood and of the similar likelihoods; and the processor, upon receiving additional empirical evidence, repeating the automatically adjusting, the computing a first likelihood, the further computing similar likelihoods, and the selecting, wherein the repeated selecting selects a current optimal energy source of the set of energy sources as a further function of the additional empirical evidence

DETAILED DESCRIPTION

The present invention comprises methods and systems for an intelligent energy switch that continuously identifies an energy source that provides greatest cost effectiveness and most efficient operation available at the moment to an energy consumer and automatically switches all or part of the consumer's premises to that source until that source is no longer optimal.

Embodiments of the present invention identify an optimal source by performing mathematical operation on values of numerous parameters associated with relative costs and operational suitability of each energy source. Here, operational suitability refers to how well-suited a performance of an energy source is to non-financial requirements of an energy consumer. These parameters may, for example, comprise variables that identify characteristics of each candidate energy source, such as operational conditions, parameters of the source equipment's capital/operational expenditures and various financial incentives attached to usage of such energy source, that are specific to the consumer or to a specific installation of the consumer, that describe historical cost information, or that identify dependencies and other relationships among any of these entities.

Embodiments of the present invention may further employ self-learning, machine-learning, or artificial-intelligence technologies that allow an embodiment to further identify an optimal energy source as a function of the embodiment's previous choices of energy source, or as a function of whether a previous choice was, in retrospect, indeed optimal.

Benefits of the present invention may comprise lower consumer energy bills, an increase lifespan of a consumer's privately owned energy-generation facilities, a reduced load or a less volatile load on a public power utility, or a lowered carbon footprint associated with the consumer's energy consumption.

Figure 1:
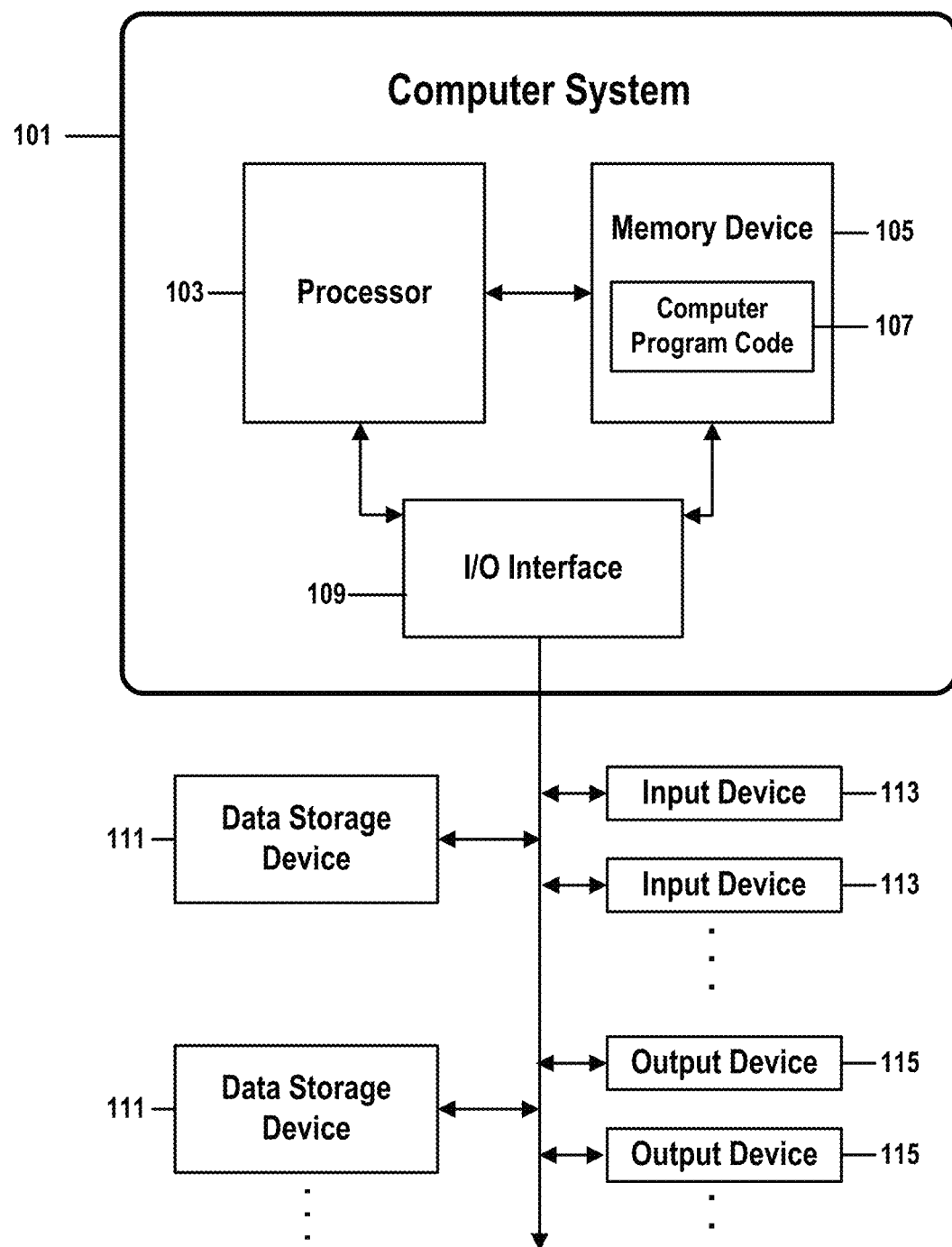
FIG. 1 shows the structure of a computer system and computer program code that may be used to implement a method for an intelligent energy switch in accordance with embodiments of the present invention.

FIG. 1 shows a structure of a computer system and computer program code that may be used to implement a method for an intelligent energy switch in accordance with embodiments of the present invention. FIG. 1 refers to objects 101-115.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for an intelligent energy switch in accordance with embodiments of the present invention, and may implement other embodiments described in this specification, including the methods illustrated in FIGS. 1-5. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for an intelligent energy switch.

Any of the components of the present invention could be created, integrated, hosted, maintained, deployed, managed, serviced, supported, etc. by a service provider who offers to facilitate a method for an intelligent energy switch. Thus the present invention discloses a process for deploying or integrating computing infrastructure, comprising integrating computer-readable code into the computer system 101, wherein the code in combination with the computer system 101 is capable of performing a method for an intelligent energy switch.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for an intelligent energy switch may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for an intelligent energy switch data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
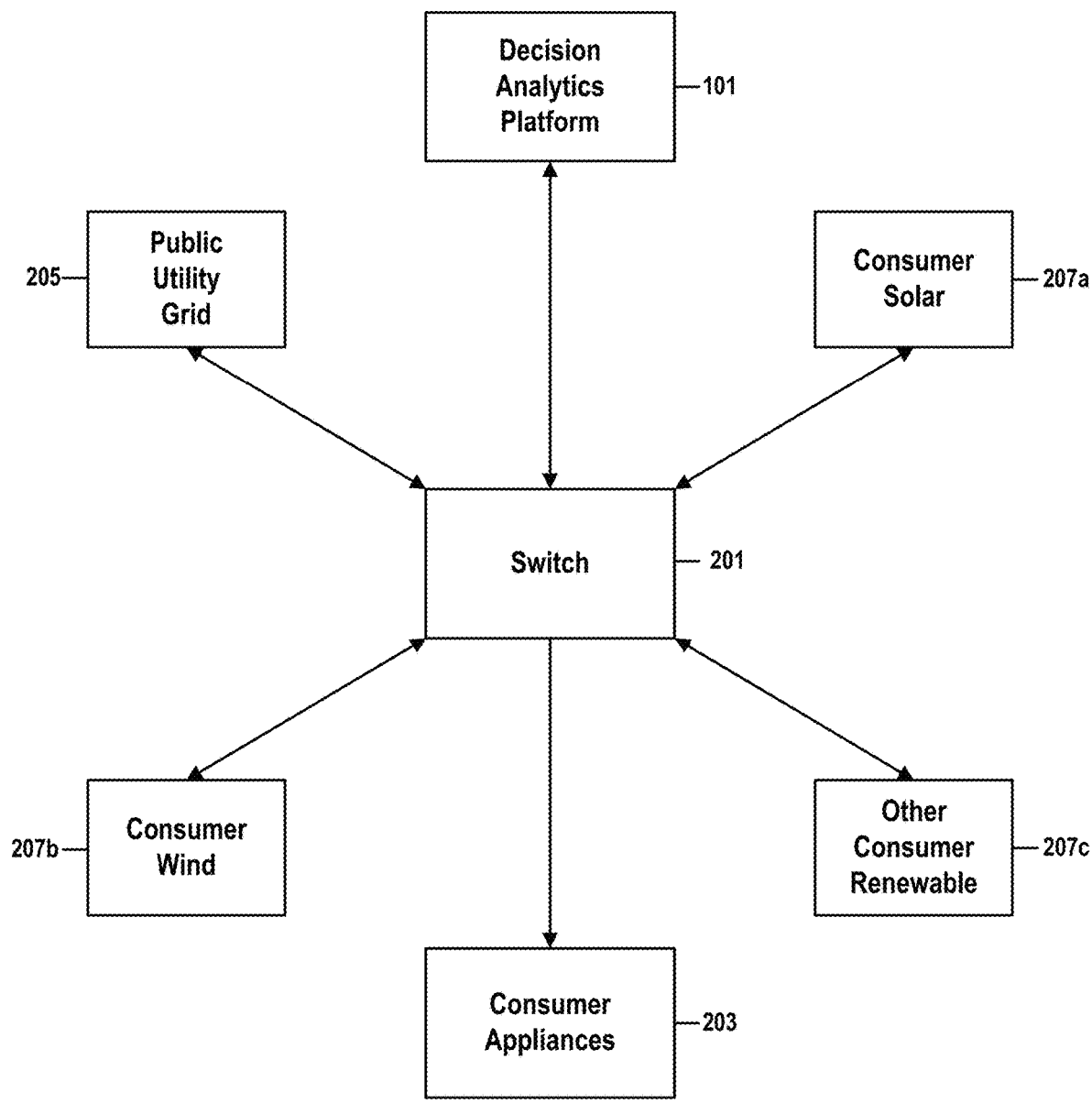
FIG. 2 is a structure diagram that shows one possible architecture of an embodiment of the method of the present invention.

FIG. 2 is a structure diagram that shows one possible architecture of an embodiment of the method of the present invention. FIG. 2 shows elements identified by reference numbers 101, and 201-207c.

Reference item 101 is a computerized platform, as described more fully in FIG. 1, that is used in embodiments of FIG. 2 to select an optimal energy source. This selection procedure is described in greater detail in FIGS. 3 and 4.

Item 201 is a switching mechanism that, under the direction of the decision platform 101, switches a consumer's energy-consuming appliances 203 to an energy source identified by the decision platform 101. Switch 201 communicates bidirectionally with the computerized platform 101 and may communicate bidirectionally with each energy source 205-207c.

In some embodiments, switch 201 may route power between two energy sources 205-207c. This may occur, for example, when a consumer wishes to route excess power produced by an alternative energy source 207a-207c to the public utility 205.

Switch 201 must be able to respond quickly enough to provide real-time performance (or performance that is substantially close to real-time) in order to ensure that an identification of an optimal energy source is still valid by the time the switch 201 switches to that source. Because the factors that embodiments use to identify an optimal source may change continuously, a switch that introduces latency of even a few seconds may affect an effectiveness of some embodiments.

Switch 201 must also be constructed robustly, must be able to route electrical current of amperage high enough to drive the consumer's appliances 203, and must be engineered and isolated so as to reduce back-EMFs and other reactance-related effects that may be caused by rapid switching physically disparate high-voltage or high-current sources among what may be complex, reactive loads.

Switch 201 may comprise any one or more switching technologies known in the art that are capable of glitch-free switching between high-current energy sources. These may include known a combination of known switching technologies, such as electromechanical switches, solenoid-controlled mechanical relays, a bank of circuit breakers, one or more transfer switches, or a computerized switching array.

The switch 201 normally routes electrical power from an energy source 205-207c to consumer premises 203. But some embodiments may further allow switch 201 to route electrical power from a consumer's energy source 207a-207c to a public power utility 205 through the utility's 205 public grid infrastructure. In some embodiments, this may occur when a consumer's privately owned energy sources 207a-207c produce more power than the consumer requires, and when the consumer's contractual agreements with the public utility 205 allows or requires the utility 205 to buy back excess power generated by the consumer.

Item 203 is described in this document, for sake of clarity, as comprising "consumer appliances," but may in some embodiments, comprise any energy-consuming entity desired by the consumer to be powered by one of energy sources 205-207c.

Item 205 is a public-utility power source, generally delivered to consumer appliances 203 through a public power grid. This public power source is generally delivered to the consume through the public grid, but may ultimately be generated by any known means, such as by burning oil or natural gas, by geothermal, wind, battery, or solar power-generation mechanisms, or by a combination thereof. In embodiments where a consumer has access to more than one public utility, all of these utilities would be interfaced to switch 201 in the same way as public power source 205. In all cases, a public utility, if it is included in the embodiment, would be a default choice that would be available to a consumer even if the present invention is not implemented, and that bills the consumer in a manner that may be similar to those of other contemporaneous public utilities.

Items 207a, 207b, and 207c are representative examples of alternative energy sources available to the consumer. These may include, but are not limited to, renewable sources owned by the consumer or otherwise made available to the consumer by third-party energy providers. Such alternative sources may comprise a wind farm, a solar-panel array on a roof of the consumer's house, or a geothermal power source. Some embodiments may further comprise a different number of alternative energy sources.

Although embodiments of the present invention are most useful when one of the candidate energy sources is the public power grid 205, other embodiments may comprise any combination of energy sources that may be switched by switching mechanism 201.

Figure 3:
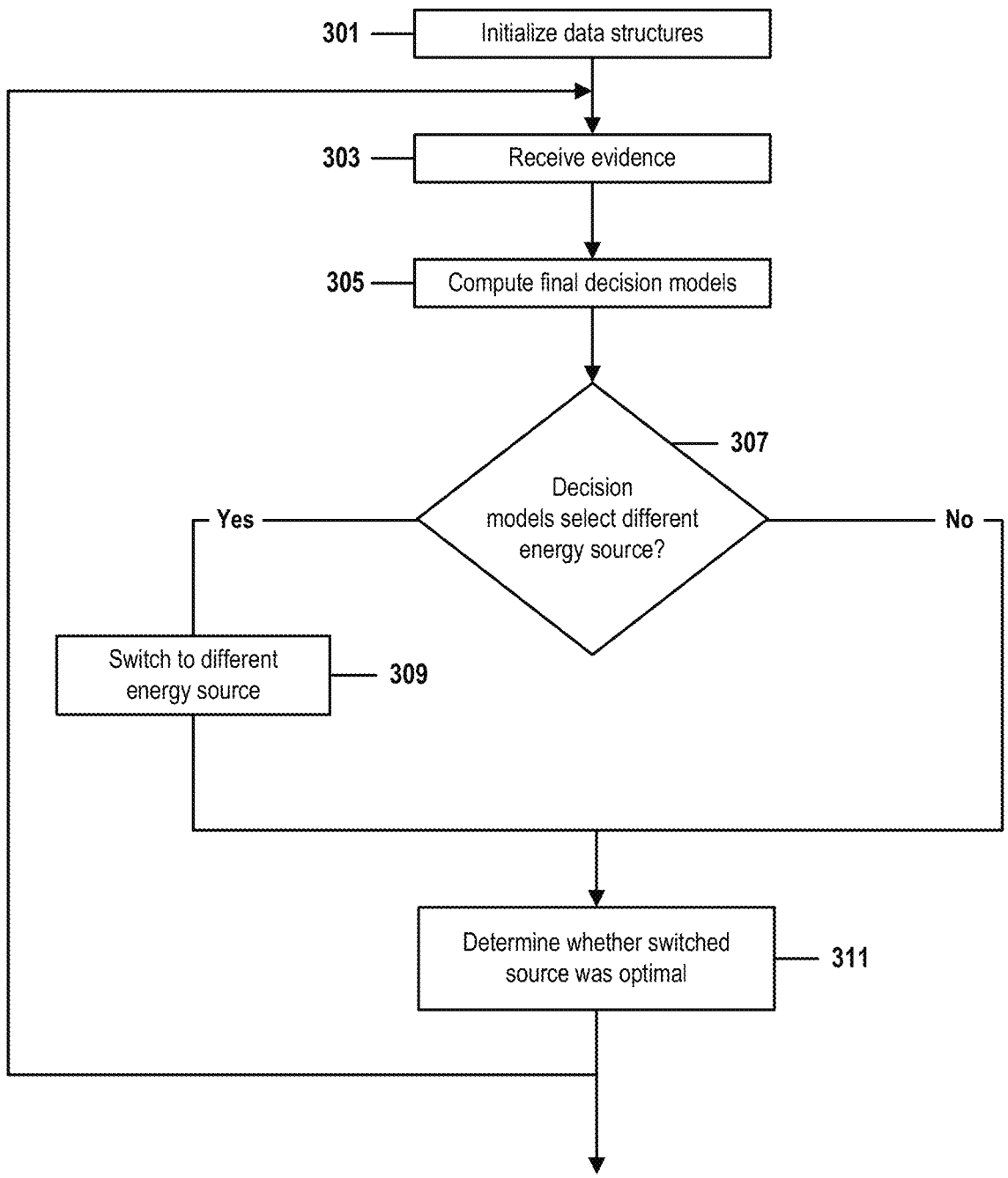
FIG. 3 is a flow chart that illustrates steps of a method for an intelligent energy switch in accordance with embodiments of the present invention.

FIG. 3 is a flow chart that illustrates steps of a method for an intelligent energy switch in accordance with embodiments of the present invention. FIG. 3 contains steps 301-311 which may be performed by embodiments of the present invention that incorporate structures of FIG. 2. Embodiments of FIG. 3 are described in greater detail in FIG. 4.

In step 301, the intelligent switch shown in FIGS. 1 and 2 constructs or receives a framework of a multidimensional data structure that will be used in subsequent steps of FIG. 3. This framework may comprise a set of cognitive variables for each of the candidate energy sources 205-207c of FIG. 2. Each model of each set "votes" for or against switching consumer appliances 203 to its corresponding energy source of sources 205-207c and a final decision whether to switch to a particular source of sources 205-207c is computed by considering votes of all cognitive variables associated with that particular source.

Because such a vote comprises predicting interrelated future events and behaviors of issues associated with an energy source, these cognitive variables employ methods of fuzzy logic in order to assign to their recommendations probabilities of accuracy. Thus each cognitive variable's recommendation may take the form of: a "yes" probability that a recommendation to switch to a corresponding source will correctly identify that the corresponding source is an optimal selection; a "no" probability that a recommendation against switching to the corresponding source correctly identifies that the corresponding source is not an optimal selection; and a "yes/no/maybe" degree of uncertainty in the variable's "yes" and "no" recommendations.

Figure 4:
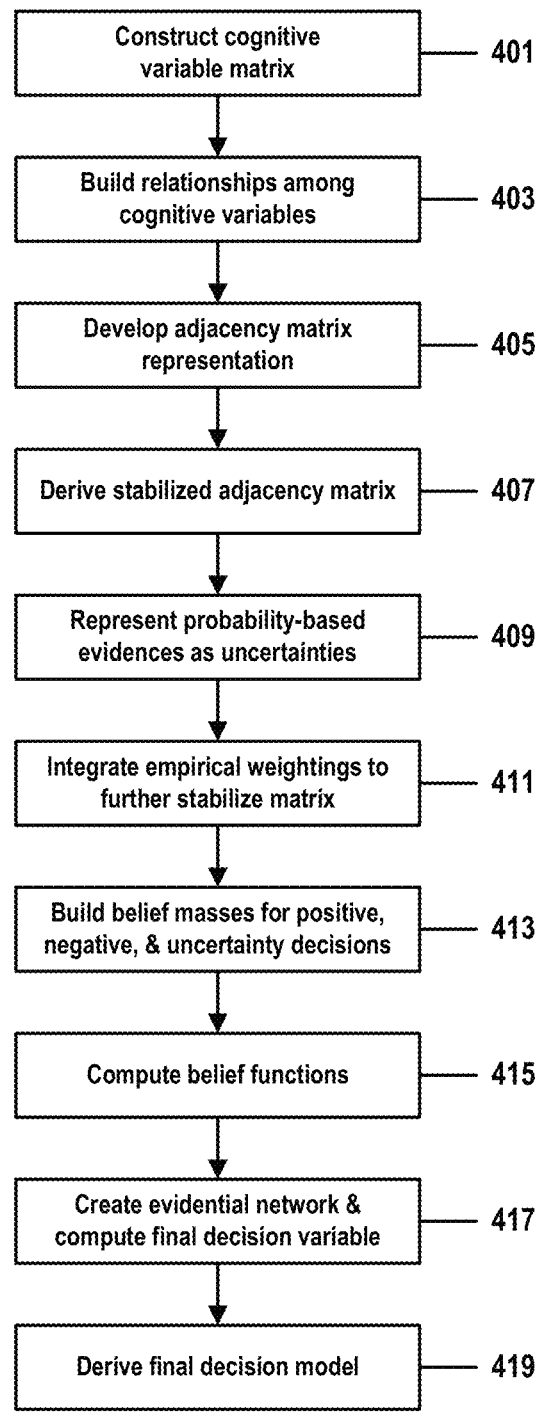
FIG. 4 is a flow chart that illustrates steps of a computational method of FIG. 3 in greater detail.

These data structures may be created and populated by methods and from sources described in more detail in FIG. 4.

In step 303, the system may receive "evidence" that is used to fine-tune the models created in step 301. The system then integrates this received information into the model, allowing the model to "self-learn" by adjusting the models to accommodate the new evidence.

In step 305, the system, through a complex system of computations, computes a final decision variable for each candidate energy source 205-207c. Each of these final decision variables is associated with one set of the cognitive variable models created in step 301 and self-adjusted in step 303. As above, each final decision variable may take the form of a "yes" probability, a "no" probability, and an uncertainty value in those probabilities.

The system then derives a final decision model that identifies whether to switch to an energy source 205-207c that is different than the source currently in use. The system computes the final decision model as a function of the final decision variables associated with each energy source 205-207c.

In other words, the system computes a set of cognitive models for each candidate energy source; combines each set mathematically to produce a fuzzy set of yes/no/uncertainty probabilities for one of the candidate sources, then mathematically combines and compares these individual-source probabilities into a single decision model that will allow the system select a source that is most likely to be an optimal source.

In step 307, the system determines whether the source identified by the final decision model in step 305 as being optimal is different than the source currently in use. If the system determines that a different source should be placed into service, then the method of FIG. 3 continues with step 309. Otherwise, it continues directly to step 311.

In step 309, the system, by means of switch 201, switches consumer appliances 203 to the optimal energy source of sources 205-207c that was identified by the final decision models in step 305.

In step 311, the system determines whether the currently selected energy source of sources 205-207c was optimal. This may occur over a brief period of time, or over an extended period of time, depending on embodiment details and on the platform and environment within which the embodiment is implemented.

This determination may be performed as a function of additional evidence that arrives after the computation of the final decision models in step 305. The determination may also be performed as a function of observations that identify whether and for how long the most recently selected source performed in an optimal manner.

Additional evidentiary information may also be received during a performance of this step. In some embodiments, additional evidentiary information may be received at any time. As described above, this additional evidence may comprise observations by the system about whether a selected energy source is indeed an optimal choice, and may further comprise extrinsic information that may affect values associated with the cognitive variable models.

At the conclusion of step 311, the system may return to step 303 and repeat the procedure of steps 303-311. In some embodiments, the system will then in step 303 receive additional evidence, if any has accumulated since the last iteration of step 303. In step 305, the system will engage in a self-learning procedure by integrating into the cognitive models evidence identified since the previous iteration of step 305.

In some embodiments, the system will continue in this manner, continuously responding to newly received information by intelligently revising its models as a function of the new evidence, using those revised models to update its selection of an optimal energy source, and then automatically switching sources if the selected optimal source is not already in use.

Because of the rapidly varying states of extrinsic and intrinsic factors and evidentiary data that inform the cognitive models, and of the complex dependencies and other relationships among those factors and data, embodiments of the present invention must respond quickly to changes that may affect a selection of an optimal energy source. In some embodiments, the intelligent switch should be configured to switch as fast as possible without introducing inefficiencies within the physical constraints of the switch 201 and the energy sources 205-207c. In all embodiments, the procedure of steps 303-309 should be performed quickly enough to ensure that the factors and evidence that determine a switching decision remain current at least until the switching can be completed. The self-learning fuzzy-logic components of embodiments described in this document attempt to address this issue by assigning probabilities to its predictions of future events and behavior that may affect those factors and evidence.

FIG. 4 is a flow chart that illustrates steps of a method of FIG. 3 in greater detail. FIG. 4 contains steps 401-419 which may be performed by embodiments of the present invention that incorporate structures of FIG. 2.

In step 401, the intelligent switch shown in FIGS. 1 and 2 constructs or receives a framework of a multidimensional data structure that will be used in subsequent steps of FIG. 4 to identify an optimal energy source 205-207c.

In embodiments and examples used in this document, this data structure will be referred to as a "cognitive variable matrix" (or "CVM") because it is a multidimensional matrix that comprises variables that may be associated with cognitive, self-learning, machine-learning, or artificial-intelligence functions.

This CVM may be populated manually by a system designer or by the consumer, may be populated as a function of default values that may have been preselected as a function of characteristics of the energy sources 205-207b, of the consumer's appliances 203, of a characteristic of the switch 201 or decision platform 101, of internal or extrinsic infrastructure by which energy is routed to or from the consumer appliances 203, of the consumer itself, or of combinations thereof.

In some embodiments, these cognitive variables may be computed or otherwise derived from input variables that characterize any combination of these factors and the specific factors and variables that are represented in the CVM may change over time as the embodiment self-learns by analyzing results of prior energy selections. These cognitive variables, and the factors from which they are derived, may be related in simple or complex, unidirectional or bidirectional, dependency relationships, meaning that changing a value of one variable or factor may result in changes to other variables or factors.

In some embodiments, each cognitive variable comprises a model of a cost-effectiveness, capacity, reliability, or other class of characteristics associated with an energy source 205-207c. In such embodiments, each cognitive variable/model returns, as a function of the characteristics upon which it is based, a set of probabilities that its corresponding energy source is an optimal selection at the current time. As will be described below, an evaluation of probabilities returned by all cognitive variables associated with a particular energy source may be used by embodiments of the present invention to determine an overall probability that the corresponding source is a most cost-effective, or otherwise optimal, selection at the current time.

In other embodiments, a choice of which variables and factors to include in the CVM may be standardized or automated, or may be chosen by means of a standardized or automated selection procedure that may in turn be a function of one or more of the same variables.

In embodiments described by FIG. 4, these variables may comprise interrelated models associated with the user's energy consumption behavior and options. These models may, comprise (but are not limited to):

an Energy model, which is computed as a function of input variables that may comprise a current unit price of an energy source. This model may be used to compare the selling price of power provided by a public utility to costs of the consumer's privately owned energy sources;

an Operational factor model, based on input variables that might comprise a current weather-related condition, a weather forecast, a condition (or "device health") of a component device of an energy source, an effect of warranties and insurance that may offset negative device health considerations, an historic energy-consumption pattern, or utility company records. This model may be used to identify how these and other, mostly non-financial, considerations might make a particular energy source more or less likely to be an optimal selection at the current time.

an Energy-Demand/Energy-Forecast model that may be computed from input variables like an current energy-production rate of each energy source, energy-generation forecasts, current energy demands associated with a particular type of energy source, and forecasts of future energy demands upon a particular type of energy source. This model may be used to identify, among other things, whether an amount of power that may be available from a privately owned renewable energy source may satisfy the consumer's current and forecast energy needs;

a Capex/Opex (capital expenditure/operational expenditure) model derived from input variables associated with a consumer's energy-related capital expenditures or operational expenditures, such as bill of material costs, installation costs, operation costs, maintenance costs, and depreciation expense. This model may identify whether an energy source's unit cost provides savings sufficient to offset that source's other costs; and an Incentive model, computed as a function of values of input variables associated with subsidies or tax incentives, such as a Green Energy incentive or a Peak Load incentive. This model may help account for the economic effect of such subsidies and incentives on the consumer's choice of energy source.

Embodiments of the present invention may further comprise a sixth model, referred to here as a Renormalization model. This model will be used in steps below to normalize, fine-tune, and ensure accuracy and consistency of results produced by embodiments of the present invention.

If an initial version of a cognitive variable matrix, represented as a matrix $C_i$, comprises six cognitive variable models identified as $N_1 \ldots N_6$, the CVM may be expressed as:

$$C_i = \begin{pmatrix} \text{Energy Modeler} \\ \text{Operational Factor Modeler} \\ \text{Energy Demand} - \text{Forecast Modeler} \\ \text{Capex Opex Modeler} \\ \text{Incentive Modeler} \\ \text{Renormalization Modeler} \end{pmatrix} = \begin{pmatrix} N_1 \\ N_2 \\ N_3 \\ N_4 \\ N_5 \\ N_6 \end{pmatrix} \quad (1)$$

In step 403, the intelligent switch identifies relationships, including dependency relationships, among the cognitive variables of the matrix. These relationships may be expressed as an adjacency matrix, in which an existence of a dependency relationship between a first (input) cognitive variable and a third (output) cognitive variable would result in a nonzero value of a third column of a first row of the adjacency matrix. Similarly, an existence of a dependency relationship between a third (input) cognitive variable and a first (output) cognitive variable would result in a nonzero value of a first column of a third row of the adjacency matrix.

In equation (1) above, a corresponding adjacency matrix would be a 6×6 matrix, in which each entry represents a dependency relationship in which the entry's row position identifies an output (dependent) variable of the relationship and the entry's column position identifies an input (independent) variable of the relationship. Entry $C_{24}$, for example, would be nonzero if a value of cognitive variable 2 (Operational Factor model) is dependent upon a value of cognitive variable 4 (Capex/Opex model).

In one example, the set of dependency relationships listed below (where "A→B" identifies a relationship in which a value of B depends upon a value of A), would result in the adjacency matrix of equation (2).

---

Indicative impact relationship within cognitive variables, directions and level of impact Operational Modeler → Energy Price modeler
Better the device Health/Weather Forecast, better the unit price for renewable Generation
Energy Price modeler → Operational Modeler
More the Energy Price, typically lesser the consumption
Operational Modeler → Demand/Forecast Modeler
Better the weather forecast and device health, better renewable generation and forecast
Demand/Forecast Modeler → Operational Modeler
Lower the demand forecast by source, likelihood of lower the historic consumption
Operational Modeler → Capex/Opex Modeler
Better the device health, lower the operation & Maintenance cost
Capex/Opex Modeler → Operational Modeler
Higher the the operation & Maintenance cost, likely hood of bad device health
Operational Modeler → Incentive Modeler
Lesser the Historical Consumption, likelihood of higher incentives
Incentive Modeler → Operational Modeler
Higher the Peak/DR incentive history, likelihood of lower consumption history
Energy Price modeler → Incentive Modeler
Higher the Unit Price from Utility at peak, likelihood of higher Peak/DR Incentive
Demand/Forecast Modeler → Incentive Modeler
Higher the renewable generation, higher the incentives
Incentive Modeler → Demand/Forecast Modeler
Higher the incentives, likelihood of lesser demand by source
Demand/Forecast Modeler → Capex/Opex Modeler
Higher the renewable generation, higher the Opex Cost
Capex/Opex Modeler → Demand/Forecast Modeler
Higher the Opex Cost, lesser likelihood of renewable generation
Energy Price modeler → Demand/Forecast Modeler
Higher the unit price of renewable, lesser likelihood of renewable generation
Demand/Forecast Modeler → Energy Price modeler
Higher the renewable generation forecast, likelihood of lesser unit price of renewable
Capex/Opex Modeler → Energy Price Modeler
Higher the Opex Cost, higher the unit price of renewable generation

---

$$e_{ij} = \begin{pmatrix} C_{11} & C_{12} & C_{13} & C_{14} & C_{15} & C_{16} \\ C_{21} & C_{22} & C_{23} & C_{24} & C_{25} & C_{26} \\ C_{31} & C_{32} & C_{33} & C_{34} & C_{35} & C_{36} \\ C_{41} & C_{42} & C_{43} & C_{44} & C_{45} & C_{46} \\ C_{51} & C_{52} & C_{53} & C_{54} & C_{55} & C_{56} \\ C_{61} & C_{62} & C_{63} & C_{64} & C_{65} & C_{66} \end{pmatrix} = \quad (2)$$

-continued $$\begin{pmatrix} 0 & -H & -H & 0 & +M & 0 \\ +H & 0 & +H & -H & -M & 0 \\ -M & +M & 0 & +H & +H & 0 \\ +H & -M & +H & 0 & 0 & 0 \\ 0 & -M & -M & 0 & 0 & 0 \\ 0 & 0 & 0 & 0 & 0 & 0 \end{pmatrix}$$

In its simplest form, each entry in adjacency matrix (2) will contain either a value of 0, if there is no dependency relationship between the model/modeler cognitive variables that correspond to the entry's row and column positions, or a value of 1 if such a relationship does exist.

In more sophisticated embodiments, based on methods of fuzzy logic, an entry may comprise other nonzero values that quantify "maybe" high, medium, or low probabilities that a relationship between the corresponding variables exist. In the sample matrix of equation (2), for example, a positive +H value might indicate a "high" degree of positive correlation between an input variable and an output variable associated with the column and row positions of that entry (that is, a high probability that increasing a value of the input variable increases a value of the output variable), or a negative value of -M or -L might respectively indicate a "medium" or "low" negative correlation between input and output variables (a medium probability that increasing a value of the input variable decreases a value of the output variable).

Such an embodiment can be seen in the example of equation (2), where an increase in a value of a health/weather forecast variable (perhaps do to an existence of better equipment health or a favorable weather forecast) comprised by the Operational Factor model (model #2 of 6) results in an increase in a value of a unit price for renewable generation variable (such as a lower renewable-energy unit price) comprised by the Energy Price model (model #1 of 6). There is thus a positive dependency relationship between these two models in which the (output) Energy Price model depends upon the (input) Operational Factor model. This is represented in the adjacency matrix of equation (2) as a positive nonzero value of matrix entry $C_{21}$. This entry is identified in this example as a "High" value by its nonzero value of +H.

In step 405, L, M, and H relationships may be assigned initial numeric "fuzzy value" equivalences. For example, in the above equations, L, M, and H may respectively be equated to initial values of 0.3, 0.6, and 1.0, and -H, -M and -L might respectively be equated to values of -1.0, -0.6, and -0.3. Exact values of these equivalent fuzzy values may be selected as a function of a standard framework associated with a particular customer, energy supplier, energy source, usage pattern, system platform, or other implementation-dependent factor.

Similarly, the dependency relationships identified by the adjacency matrix may be identified by a system designer or implementer, or by the customer as a function of implementation-dependent considerations, or may be predetermined as a function of implementation-dependent factors or expert knowledge.

Given the above exemplary fuzzy logic probability values, matrix $e_{ij}$ of equation (2) would reduce to:

$$e_{ij} = \begin{pmatrix} 0 & -H & -H & 0 & +M & 0 \\ +H & 0 & +H & -H & -M & 0 \\ -M & +M & 0 & +H & +H & 0 \\ +H & -M & +H & 0 & 0 & 0 \\ 0 & -M & -M & 0 & 0 & 0 \\ 0 & 0 & 0 & 0 & 0 & 0 \end{pmatrix} = \quad (3)$$

$$\begin{pmatrix} 0 & -1.0 & -1.0 & 0 & +0.6 & 0 \\ +1.0 & 0 & +1.0 & -1.0 & -0.6 & 0 \\ -0.6 & +0.6 & 0 & +1.0 & +1.0 & 0 \\ +1.0 & -0.6 & +1.0 & 0 & 0 & 0 \\ 0 & -0.6 & -0.6 & 0 & 0 & 0 \\ 0 & 0 & 0 & 0 & 0 & 0 \end{pmatrix}$$

At the conclusion of step 405, the switch will have identified and populated a causal edge matrix $e_{ij}$ (3) that identifies probabilities of relationships among elements of the cognitive variable matrix. In some embodiments, the underlying information represented by matrix equation (3) may be formatted by different methods known in the art. For example, using means known in the art, the cognitive variables and relationships between pairs of these variables might be represented as one or more directed graphs.

Regardless of format or representation details, or of an exact selection of cognitive models or variables and the variables from which they are derived, some sort of initial fuzzy representation of intervariable relationships is an essential part of the present invention. Without a fuzzy-logic representation of such relationships, an embodiment would not be able to keep track of complex, dynamic dependencies among what may be a set of continuously changing cognitive variables.

This is especially true in embodiments wherein membership of the current set of variables, as well as dependencies between pairs of variables, are themselves continuously changing as the switch self-learns in real-time how to better model the customer's energy choices each time the switch makes an energy-source selection. In such models, complex, multilevel ripple effects that result from even a simple change to such a dynamic variable set would be impossible to track by means of a manually maintained matrix, or by means of a model that does not account for such dependencies through a mechanism similar to the above cognitive fuzzy logic-based data structure. Identifying and accounting for such ripple effects in real time, or even merely quickly enough to render an energy-source selection relevant, would be an even greater hurdle.

In step 407, the switch 201 revises the adjacency matrix of equation (3) to be more "stable" during iterative revisions of subsequent steps of FIG. 2. This stabilization is performed by deriving from the matrix a "centrality" value $CEN(C_i)$ for each node $C_i$ of the adjacency matrix.

Centrality values are computed by means of equation (4) below:

$$CEN(C_i) = IN(C_i) + OUT(C_i) \quad (4)$$

where $IN(C_i)$ is a sum of absolute values of an $i_{th}$ column of the adjacency matrix and identifies a cumulative strength of inputs entering the cognitive variable associated with that column; and $OUT(C_i)$ is the sum of absolute values of an $i_{th}$ row of the adjacency matrix and identifies a cumulative strength of connections exiting the cognitive variable.

In our ongoing example, performing these computations on the matrix of equation (3) produces a stabilized matrix $C_{Cent}$ shown in equation (5):

$$e_{ij} = \begin{pmatrix} 0 & -1.0 & -1.0 & 0 & +0.6 & 0 \\ +1.0 & 0 & +1.0 & -1.0 & -0.6 & 0 \\ -0.6 & +0.6 & 0 & +1.0 & +1.0 & 0 \\ +1.0 & -0.6 & +1.0 & 0 & 0 & 0 \\ 0 & -0.6 & -0.6 & 0 & 0 & 0 \\ 0 & 0 & 0 & 0 & 0 & 0 \end{pmatrix} \quad (3)$$

$$C_{Cent} = \begin{pmatrix} IN(C1) + OUT(C1) \\ IN(C2) + OUT(C2) \\ IN(C3) + OUT(C3) \\ IN(C4) + OUT(C4) \\ IN(C5) + OUT(C5) \\ IN(C6) + OUT(C6) \end{pmatrix} = \quad (5)$$

$$\begin{pmatrix} (0+1+1+0+.6+0)+(0+1+.6+1+0+0) \\ (1+0+1+1+.6+0)+(1+0+.6+.6+.6+0) \\ (1+1+0+1+.6+0)+(.6+.6+0+1+1+0) \\ (1+.6+1+0+0+0)+(0+1+1+0+0+0) \\ (0+.6+.6+0+0+0)+(.6+.6+1+0+0+0) \\ (0+0+0+0+0+0)+(0+0+0+0+0+0) \end{pmatrix} =$$

$$C_{Cent} = \begin{pmatrix} 2.6 + 2.6 \\ 3.6 + 2.8 \\ 3.6 + 3.2 \\ 2.6 + 2 \\ 1.2 + 2.2 \\ 0 + 0 \end{pmatrix} = \begin{pmatrix} 5.2 \\ 6.4 \\ 6.8 \\ 4.6 \\ 3.4 \\ 0 \end{pmatrix}$$

In some embodiments, values of this matrix may be normalized in order to facilitate further computations, using means known in the art. In examples shown here, we normalize equation (5) such that a sum of all the centralized values of matrix $C_{Cent}$ equals a value of 1, as shown in equation (5a).

$$C_{Cent} = \begin{pmatrix} 2.6 + 2.6 \\ 3.6 + 2.8 \\ 3.6 + 3.2 \\ 2.6 + 2 \\ 1.2 + 2.2 \\ 0 + 0 \end{pmatrix} = \begin{pmatrix} 5.2 \\ 6.4 \\ 6.8 \\ 4.6 \\ 3.4 \\ 0 \end{pmatrix} = \begin{pmatrix} 0.20 \\ 0.24 \\ 0.26 \\ 0.17 \\ 0.13 \\ 0.00 \end{pmatrix} \quad (5a)$$

In embodiments, the resulting values of may be considered to be cognitive weightings that are used to appoint relative importance to each cognitive variable as a function of the relative importance of the relationships identified in equations (2) and (3). The values derived above in equation (5a) are functions of the initial statement of dependency relationships. As an embodiment of the present invention continues to select optimal energy sources and observe how accurately each selection identified an optimal source, these cognitive weightings (and the factors and relationships from which they were derived) may continue to be adjusted.

This continuous adjustment allows embodiments to self-learn with each selection by adjusting weightings (that is, the relative significances) associated with each of the six cognitive variables described in the above examples.

In step 409, the system may identify sources of empirical data known as "evidences." This is a first step toward incorporating a set of fuzzy-logic functions that will allow an embodiment to continuously adjust its analyses through experiential learning. In compliant embodiments, trends and other information inferred from these evidences may enable the embodiment to teach itself about past and current behaviors of the cognitive variables and dependencies that may better help the embodiment more accurately forecast future behaviors.

In some embodiments, evidences might comprise internally generated information correlating the embodiment's past success rate to specific cognitive variables, to specific inputs or dependencies associated with the cognitive variables, or to combinations thereof. In some embodiments, evidences might comprise newly available extrinsic data that helps the embodiment better identify trends, relationships, dependencies, and other factors relevant to making an accurate selection of an optimal energy source.

In embodiments and examples described in FIG. 4, this self-learning capability may be implemented by means of probability functions P that represent uncertainties (as functions of empirical evidences) inherent in predicting future behavior of the cognitive variables. These probabilities may thus help an embodiment more reliably predict uncertain future events and behaviors associated with the variables. In this way, methods of the present invention may increase a likelihood that an embodiment will select an optimal energy source that, rather than merely being a most cost-effective choice at a time of the selection, may be an optimal choice over a longest period of time after the selection.

In step 411, the system may further identify a second set of weightings that may be used in the same manner as those of equations (5) and (5a), and that may also be fine-tuned over time as an embodiment self-learns by considering the results of each of its selections.

In embodiments that comprise this second set of weightings, they will be referred to here as a set of "empirical" weightings $w_e$ because they are identified as functions of empirical evidence identified in step 409 or as functions of other expert knowledge or user input. Like the cognitive weightings, each empirical weighting is associated with one and only one cognitive variable.

If, for example, it is known in the art that government incentive programs are half as significant as installation costs when computing true costs of a consumer-owned solar power system, then an empirical weighting $w_5$ associated with the cognitive variable Incentive Modeler might be assigned an initial value that is one-half the value assigned to weighting $w_4$, which is associated with the cognitive variable Capex/Opex Modeler.

For each cognitive variable, we thus define an aggregate weighting that is computed as a sum of a cognitive weighting associated with that cognitive variable and an empirical weighting associated with that cognitive variable. As in equation (5a), a set of derived empirical weightings may be normalized so as to allow empirical and cognitive weightings to be added together without distorting the relative importance of either type of weighting.

This procedure is summarized in the below equations.

$$w_e = \begin{pmatrix} 0.20 \\ 0.15 \\ 0.10 \\ 0.25 \\ 0.30 \\ 0.00 \end{pmatrix} \quad (6a)$$

Equation (6a) identifies an initial value of the six empirical weightings assigned respectively to the six cognitive variables of the original adjacency matrix. These initial weighting values may have been determined by preset rules, by expert knowledge, by historical records, or by other means known in the art. They may also be estimated by an educated consumer. In the example of equation (6a), the six empirical weightings have already been normalized by means similar to those employed in equation (5a).

$$w_i = \begin{pmatrix} 0.20 \\ 0.15 \\ 0.10 \\ 0.25 \\ 0.30 \\ 0.00 \end{pmatrix} + \begin{pmatrix} 0.20 \\ 0.24 \\ 0.26 \\ 0.17 \\ 0.13 \\ 0.00 \end{pmatrix} = \begin{pmatrix} 0.40 \\ 0.39 \\ 0.36 \\ 0.42 \\ 0.43 \\ 0.00 \end{pmatrix} \quad (6b)$$

In equation (6b), the system derives initial values of the aggregated weightings by adding the normalized values of the cognitive weightings derived in equation (5a) to the normalized values of the empirical weightings enumerated in equation (6a). These summed weightings may be renormalized to sum to a value of 1 by dividing them by 2, as shown in equation (6c).

$$w_i = \begin{pmatrix} 0.20 \\ 0.20 \\ 0.18 \\ 0.21 \\ 0.22 \\ 0.00 \end{pmatrix} \quad (6c)$$

In step 413, the system continues to build probability-based functions that will allow it to account for uncertainties associated with predicting future behavior of the cognitive variables and of the energy sources.

In various embodiments, these probabilities may be derived by any means known in the art of statistical analysis, analytics, or probability theory. The examples and embodiments described in FIG. 4 derive a set of probability distributions P by means of a novel application of the Dempster-Shafer theory. This approach, also known as a "belief-function framework", is a generalization of Bayesian frameworks that comprises a broader scope than probability theory alone.

Although beyond the scope of this document to describe in detail, Dempster-Shafer's belief-function frameworks extend Bayesian frameworks by assigning uncertainties to each of a mutually exclusive, and collectively exhaustive, set of elements $\Theta$. Here, a set $\Theta$ may comprise elements $\{a_1, a_2, a_3, \ldots a_n\}$ and is commonly referred to as a "frame of discernment" of the belief-function framework.

Applying known methods of Dempster-Shafer theory in a novel manner, embodiments in this step may associate a probability function $P(a_i)$ (referred to here as a "belief mass") to each element $a_i$ of a frame $\Theta$, where each element $a_i$ is associated with an $i^{th}$ cognitive variable of the CVM, and where each function $P(a_i)$ identifies a probability distribution of future events or behaviors that may affect a current or future value that $i^{th}$ variable. Here, each $P(a_i)$ produces probability values that fall within an inclusive range of 0 to 1). In addition, a sum of belief-mass probabilities $P(a_i)$ for all i must always equal one.

Each belief mass $P(a_i)$ may be represented as a function of a set of m-values that sum to a value of 1. In embodiments and examples of FIG. 4, each cognitive variable may be associated with three types m-values:

$m(Y_N)$ is a probability of an occurrence that the system will infer a positive recommendation from the Nth cognitive variable, $m(N_N)$ is a probability of an occurrence that the system will infer a negative recommendation from the Nth cognitive variable, and $m(YN_N)$ is a value of an uncertainty in a recommendation inferred from the Nth cognitive variable.

In one example, an m-value $m_2$ associated with the second cognitive variable (Operational Factor model) of equation (1) might be expressed as a function of three corresponding m-values that together total to a value of 1:

$$m_2 = m(Y_2) + m(N_2) + m(YN_2)$$

If evidences identified in step 411 suggest a 40% chance of a positive decision being made as a function of the Operational Factor model and a 10% chance of a negative decision being made as a function of the Operational Factor model, then there must be a 50% uncertainty in such a decision in order for $m_2$ to equal a value of 1.0. This relationship may be expressed as:

$$m_2 = 0.4 + 0.1 + 0.5 = 1.0$$

In step 415, the system computes a belief function as a function of the evidences, belief masses and m-values derived in steps 409-413.

If two or more items of evidence identified in step 409 both pertain to an $i^{th}$ cognitive variable $N_i$, then two or more sets of m-values, each corresponding to one of those items of evidence, must be computed for that $i^{th}$ variable. These m-values must then be combined in order to identify a single m-value for the $i^{th}$ variable. Such combination may be performed by applying Dempster's rule, as shown in equation (7):

$$m(B) = K^{-1} * \Sigma_{ij} m_1(B_i) * m_2(B_j) \text{ for } B_i \cap B_j = B \quad (7)$$

Here, B represents a cognitive variable; $m_1(B_i)$ is an m-value associated with an $i^{th}$ cognitive variable of the set of all cognitive variables, and further associated with a first piece of evidence; and $m_2(B_j)$ is an m-value associated with a $j^{th}$ cognitive variable (j≠i) of the set of all cognitive variables, and further associated with a second piece of evidence.

K is a factor that represents a degree of "conflict" between these two items of evidence. As will be discussed below, if K=0, the two items of evidence conflict with each other so totally that they are considered completely incompatible. Larger values of K identify lesser degrees of such conflict. When K=0, equation (7) yields an infinite value of m(B), and thus cannot be solved. Such an occurrence is one way in which a variable or piece of evidence may be removed from consideration as an embodiment continually revises values of these variables through a procedure of experiential self-learning. Some embodiments may comprise other methods of adding and removing variables and other elements of computation as a function of predefined rules.

Although K may be chosen manually by means of expert knowledge, or automatically as a function of characteristics of the pieces of evidence with which it is associated, embodiments of the present invention described in FIG. 4 may derive values of K by means of equation (8).

$$K=1-\Sigma_{ij} m_1(B_i)*m_2(B_j) \quad (8)$$

Finally, expanding equations (7) and (8) to comprise previously identified expressions of m, allows positive-decision, negative-decision, and uncertainty values of m to be derived for cognitive variable N, as a function of a piece of evidence P, by the computations below.

$$m(Y_N)=K^{-1}*[m_1(Y_N)*m_2(Y_N)+m_1(Y_N)*m_2(YN_P)+m_1(YN_P)*m_2(Y_P)] \quad (9a)$$

$$m(N_N)=K^{-1}*[m_1(N_N)*m_2(N_N)+m_1(N_N)*m_2*(YN_P)+m_1(YN_P)*m_2(N_P)] \quad (9b)$$

$$m(YN_P)=K^{-1}*[m_2(YN_P)*m_1(YN_P)] \quad (9c)$$

$$K=1-[m_1(Y_N)*m_2(N_N)+m_1(N_N)*m_2(Y_N)] \quad (9d)$$

The following example demonstrates how these equations may be used by an embodiment to produce a real-world result when two pieces of evidence affect a belief in a reliability of a cognitive variable. Consider a case for a cognitive variable N, in which:

$m_1(Y_N)$=0.4, implying a 40% chance of inferring a positive recommendation of an energy source as a function of cognitive variable N, and based on the first piece of evidence;

$m_1(N_N)$=0.1, implying a 10% chance of inferring a negative recommendation of an energy source as a function of cognitive variable N, and based on the first piece of evidence; and $m_1(\{YN_N\})$=0.5, implying 50% uncertainty in a decision based on this first set of inferences.

Further consider probabilities derived from experiential learning based on a second piece of evidence:

$m_2(Y_N)$=0.6, implying a 60% chance of inferring a positive recommendation of an energy source as a function of cognitive variable N, and based on the second piece of evidence;

$m_2(N_N)$=0.2, implying a 20% chance of inferring a negative recommendation of an energy source as a function of cognitive variable N, and based on the second piece of evidence; and $m_2(\{YN_N\})$=0.2, implying 20% uncertainty in a decision based on this second set of inferences.

Substituting these values in equations (9a)-(9d) results in:

$$K=1-[0.4*0.2+0.1*0.6]=0.86$$

$$m(Y_N)=[0.4*0.6+0.4*0.2+0.5*0.6]/0.86=0.72093$$

$$m(N_N)=[0.1*0.2+0.1*0.2+0.5*0.2]/0.86=0.16279$$

$$m(YN_P)=[0.5*0.2]/0.86=0.11628$$

The values derived here may be interpreted as representing levels of beliefs in a positive recommendation, as a function of the combined beliefs derived from two items of evidence. In this example, a belief that $m_1(Y_N)$ is true as a function of the first item of evidence is 0.4 and a belief that $m_1(Y_N)$ is true as a function of the second item of evidence is 0.6. But the combined belief that $m(Y_N)$ is true based on both items of evidence is 0.72093. Although the combined belief is stronger than either of the individual beliefs, it would have been stronger still had a conflict represented by K had not been as significant.

Embodiments of the present invention may more compactly express these results as a set of Belief functions. Here, a function Bel(B) returns a value that identifies a belief in cognitive variable B that is equal to a corresponding value of m(B) plus a sum of all m-values associated with a set of elements associated with B. In examples and embodiments described here, that set of elements is a subset of elements of a frame Θ.

Such Belief functions may thus be expressed as:

$$Bel(Y_N)=m(Y_N) \quad (10a)$$

$$Bel(N_N)=m(N_N) \quad (10b)$$

$$Bel(YN_N)=m(Y_N)+m(N_N)+m(Y_{NP}) \quad (10c)$$

In step 417, the system ties the elements derived above into a coherent evidential network and a final decision variable that, in step 419, will be used to identify a final decision model.

Figure 5:
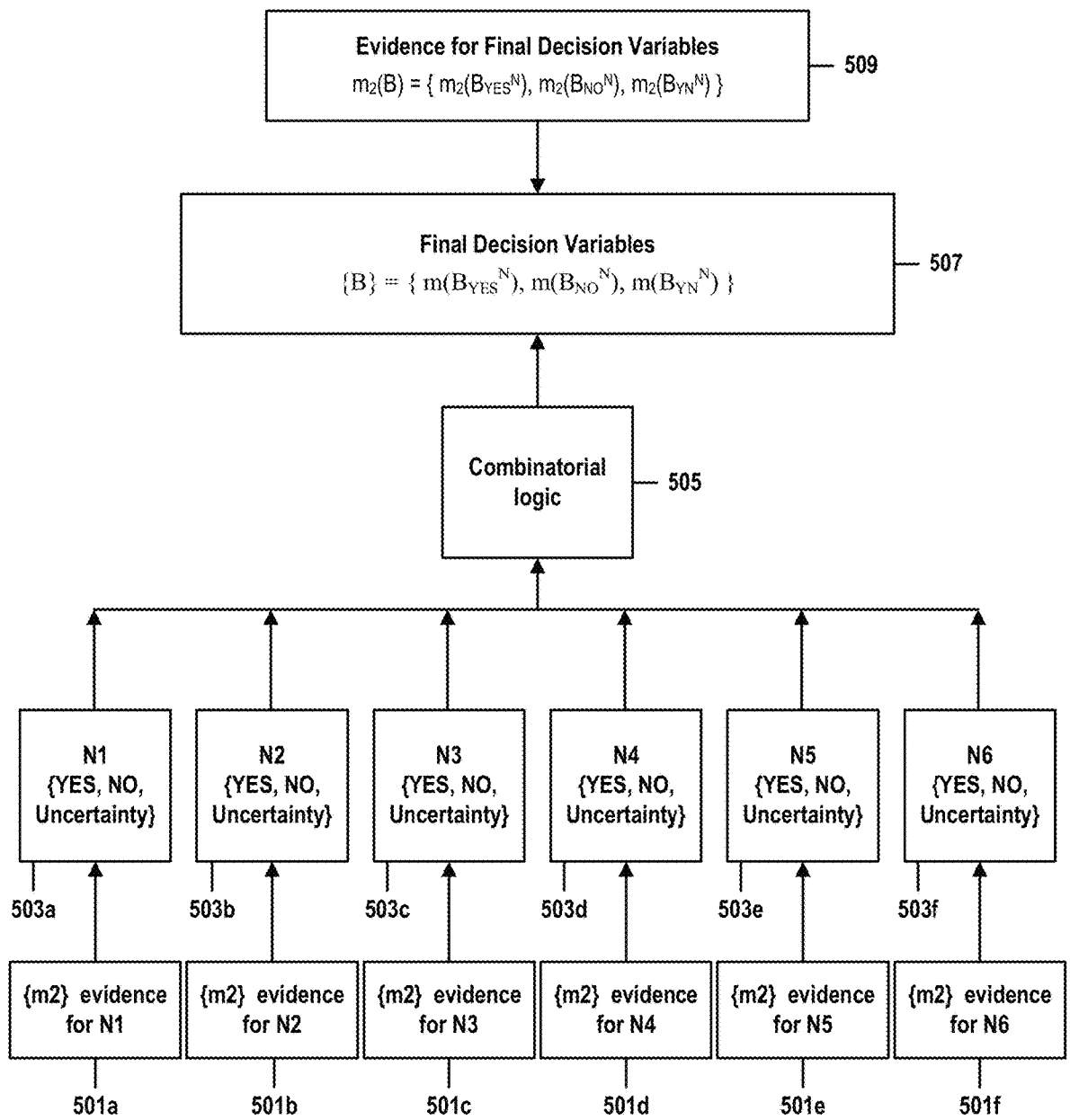
FIG. 5 shows details of the exemplary evidential network described in step 417 of FIG. 4.

FIG. 5 shows details of an exemplary evidential network, in accordance with examples and embodiments described in FIG. 4.

In this step, the system computes a final decision variable as a function of the combinatorial function and the variables and evidence that drive it. In embodiments described herein, the evidence may be mathematically combined by means of equation (11) into a composite evidentiary m-value $m_2(B)$ associated with the system's overall decision.

$$m_2(B)=\{m_2(B_{YES}^N),m_2(B_{NO}^N),m_2(B_{YN}^N)\} \quad (11)$$

After each element is computed by mathematical operations analogous to those described above, the final decision variable {B} may be represented as a 6×3 array in which each column identifies a yes, no, or uncertainty m-value and each column identifies one of the six cognitive variables.

$$\{B\}=\{m(B_{YES}^N),m(B_{NO}^N),m(B_{YN}^N)\} \quad (12)$$

Consistent with the nomenclature used throughout this document, $B_{YES}^N$, $B_{NO}^N$, and $B_{YN}^N$ represent, respectively, a probability that the $N^{th}$ cognitive variable makes a positive recommendation of a particular energy source, a probability that the $N^{th}$ cognitive variable makes a negative recommendation against selecting a particular energy source, and an uncertainty in these recommendations.

In step 419, using the above equations, the system derives a final decision model as a function of the values derived above. This final model will determine the system's final decision, which will in turn instruct switch 201 whether to switch the consumer's appliances 203 to a particular energy source 205-207c.

This procedure is computed for each candidate energy source. If, for example, as shown in FIG. 2, a consumer may choose between four candidate sources 205-207c, the method of FIG. 4 would be performed for each of the four sources 205-207c, producing a different probabilistic recommendation (and final decision model) for each candidate source.

This final model is derived in this step by means of the following computations.

Combining equation (1) with equations (10a)-(10c) produces the inferences, for each cognitive variable $N_i$:

$$\{N_i\} = \{Y_{N_i}\} = \{m(Y_{N_i})\} = Bel(Y_{N_i}) \quad (13)$$

Combining equations (5a), (10a)-(10c), and (13) then produces a final set of belief equations for the solution set:

$$B_{YES}^N = (\{[w_{e_{ij}}] + [w_{c_{ij}}]\} * Bel(Y_{N_{ij}}))/([w_{e_{ij}}] + [w_{c_{ij}}]) \quad (14a)$$

$$B_{NO}^N = (\{[w_{e_{ij}}] + [w_{c_{ij}}]\} * Bel(N_{N_{ij}}))/([w_{e_{ij}}] + [w_{c_{ij}}]) \quad (14b)$$

$$B_{YN}^N = (\{[w_{e_{ij}}] + [w_{c_{ij}}]\} * Bel(YN_{N_{ij}}))/([w_{e_{ij}}] + [w_{c_{ij}}]) \quad (14c)$$

The decisions derived from equations (14a)-(14c) may then be represented as m-values for an evidence series $m_1$. Similarly, evidences supporting the final decision identified by the final decision variable, may be represented as a set of m-values for an evidence series $m_2$:

$$\{m_1(B)\} = \{m_1(B_{YES}^N), m_1(B_{NO}^N), m_1(B_{YN}^N)\} = \{B_{YES}^N, B_{NO}^N, B_{YN}^N\}$$

$$\{m_2(B)\} = \{m_2(B_{YES}^N), m_2(B_{NO}^N), m_2(B_{YN}^N)\}$$

These final arrays of m-values may then, by means of the Dempster combination logic described above, be used to derive to derive combined m-values for the arrays of final decision variables:

$$m(B_{YES}^N) = K^{-1} * [m_1(B_{YES}^N) * m_2(B_{YES}^N) + m_1(B_{YES}^N) * m_2(B_{YN}^N) + m_1(B_{YN}^N) * m_2(B_{YES}^N)]$$

$$m(B_{NO}^N) = K^{-1} * [m_1(B_{NO}^N) * m_2(B_{NO}^N) + m_1(B_{NO}^N) * m_2(B_{YN}^N) + m_1(B_{YN}^N) * m_2(B_{NO}^N)]$$

$$m(B_{YN}^N) = K^{-1} * m_2(B_{YN}^N) * m_1(B_{YN}^N)$$

$$K = 1 - [m_1(B_{YES}^N) * m_2(B_{NO}^N) + m_1(B_{NO}^N) * m_2(B_{YES}^N)]$$

Finally, with this last set of derived array variables, embodiments of the present invention create a set of final decision models that each identify yes/no probabilities and an uncertainty into a decision whether to switch the consumer's premises 203 to any one of the candidate energy sources 205-207c.

These final decision models may take into consideration a decision policy framework that comprises threshold values, standards, and more complex rules for determining when a particular probability is sufficient to instruct switch 201 to switch the consumer to a particular energy source 205-207c.

For example, a decision policy might require that derived values fall within the following ranges in order for switch 201 to be instructed to switch to a different source than the one that is currently selected:

$$B_{yes}^N \geq 60\%$$

$$B_{no}^N \leq 25\%$$

$$B_{yes,no}^N \leq 15\%$$

In some embodiments, such a policy might be expressed in the form:

$$B_{yes}^N = \{m(B_{yes}^N) | B_{yes}^N \geq 60\%, B_{no}^N \leq 25\%, B_{yes,no}^N \leq 15\%\}$$

The method of FIG. 4 may be repeated periodically or continuously, each time fine-tuning its results through a self-learning procedure that, as described above, continues to adjust weightings, dependencies, variable lists, and other factors as functions of newly identified pieces of evidence. Embodiments may also further fine-tune by monitoring and recording the accuracy of the embodiments' previous selections and by then inferring which alternative weighting mechanisms would have resulted in a more accurate selection.

Embodiments may consider derived decision models {B} for all candidate energy sources before making a decision whether to switch the consumer's appliances 203 to a different energy source. One goal of certain embodiments is to select an optimal source by concurrently or simultaneously considering all candidate sources, where those considerations are functions of the most current evidentiary information, relative probabilities and uncertainties associated with each source-switching decision, and other factors and considerations described above.

Embodiments may perform these functions continuously, using the six cognitive models described in the first set of equations of FIG. 4 and, because of the self-learning capabilities of the system, and an assumption of a continued availability of additional evidentiary information, will ultimately be able to achieve a very high level of accuracy. This ultimate level of accuracy will allow embodiments to instantaneously identify and switch to optimal energy sources in response to real-time changes to interrelated factors as disparate as weather conditions, public utility rates, equipment failures, an expiration of a warranty, or a prediction of imminent changes in energy demands.

Furthermore, when more than one candidate source satisfies threshold criteria or other rules that make it a viable choice, embodiments of the present invention may use a sophisticated system of probability computations and fuzzy-logic elements to forecast future events and behaviors. This may allow the system to select a viable source that is most likely to be an optimal choice and to remain the optimal choice for the longest time.

FIG. 5 shows details of the exemplary evidential network described in step 417 of FIG. 4. FIG. 5 comprises items 501a-509.

As described in FIG. 4, an evidential network may comprise:

the six cognitive variables 501a-501f identified in equation (1) as $N_1 \ldots N_6$. Here, those six variables may be, respectively: the Energy Modeler, the Operational Factor Modeler, the Energy Demand-Forecast Modeler, the Capex/Opex Modeler, the Incentive Modeler, the and Renormalization Modeler. Each of these models $N_i$, at any particular time, identifies a yes-decision probability $N_{iYES}$, a no-decision probability $N_{iNO}$, and an uncertainty $N_{iYN}$ in a decision recommendation made by modeler $N_i$;

six sets 503a-503f of evidence $N_1(m2) \ldots N_6(m2)$, each respectively associated with one of the six cognitive variables 501a-501f. By means of the computations described above, ongoing variations and refinements of these sets of evidence may produce the yes, no, and uncertainty values returned by their corresponding cognitive-variable modelers;

a logical OR combinatorial function 505 that logically combines the recommendations made by the six cognitive variables. The method of combination may be a simple OR function that selects a candidate energy source so long as any of the cognitive variables presents a recommendation for that source that exceeds a predefined threshold. In other embodiments, more complex logical or mathematical combinatorial functions may be used to combine and reconcile the recommendations of the cognitive variables;

a set of final decision variables {B} computed in accordance with equation (12); and additional evidence that supports the computation of {B} in accordance with equation (11).

As described in FIGS. 3-4, embodiments generate an instance of the evidentiary network of FIG. 5 for each candidate energy source 205-207c. Each such network comprises a decision-making architecture in which cognitive variables 503a-503f, as functions of respectively corresponding collections of empirical evidence 501a-501f, each produce a triplet of yes/no/uncertainty probabilities that identify a probability that one of the energy sources 205-207c is an optimal choice under current conditions.

The probabilities generated by cognitive variables 501a-501f in one of these networks are mathematically combined by a combinatorial function 505 (described in FIG. 4). The system then uses this combined probability function, along with additional empirical evidence 509, to generate a final set of decision variables 507 from which the system may determine how likely the corresponding energy source is to be the optimal source under current conditions.

In embodiments described in FIGS. 3-4, the system then combines and compares the final sets of decision variables 507 for each candidate energy source 205-207c in order to determine which candidate 205-207c is most likely, under instant conditions to be the most cost-effective or to offer a greatest degree of operational suitability.

What is claimed is:

1. An intelligent energy-switch system comprising a processor, a memory coupled to the processor, an electronically controlled power-switching device, and a computer-readable hardware storage device coupled to the processor, the storage device containing program code configured to be run by the processor via the memory to implement a method for an intelligent energy switch, the method comprising:

the system constructing a multidimensional array of cognitive models for a first energy source of a set of energy sources,
   where each model of the multidimensional array is constructed as a function of a corresponding subset of a set of factors that affect a cost-effectiveness of the first energy source,
   where each model of the multidimensional array infers a probability that the first energy source is the optimal source based on the each model's corresponding subset of factors,
   where the multidimensional array comprises instances of six classes of cognitive models:
      a cognitive Energy model that infers a probability that the first energy source is the optimal source by identifying a unit price of energy produced by the first energy source,
      a cognitive Operational Factor model that infers a probability that the first energy source is the optimal energy source by identifying environmental factors that affect an ability of the first source to operate properly,
      a cognitive Energy-Demand/Energy-Forecast model that infers a probability that the first energy source is the optimal energy source by identifying the first energy source's ability to produce sufficient power to meet current and future energy requirements,
      a cognitive Capex/Opex model that infers a probability that the first energy source is the optimal energy source by identifying capital expenditures and operational expenditures required by using energy supplied by the first source,
      a cognitive Incentive model that infers a probability that the first energy source is the optimal energy source by identifying financial subsidies that allow the consumer to mitigate costs incurred by using energy supplied by the first energy source, and
      a cognitive Renormalization model that facilitates normalization of results of matrix computations performed on the multidimensional array, and
   where each model of the cognitive models employs fuzzy logic to assign dynamic probabilities of accuracy to the model's recommendations;

the system receiving empirical evidence that is capable of altering an effect of the set of factors upon the cost-effectiveness of the first energy source;
the system automatically adjusting, as a function of the received evidence, each model of a computational subset of the multidimensional array, where the computational subset consists of the six cognitive models;
the system computing a first likelihood that the first energy source is an optimal source of the set of energy sources,
   where an optimal energy source is able to supply energy more cost-effectively than can any other source of the set of energy sources under current operating conditions, and
   where the computing is performed as a function of all probabilities inferred by all six models of the computational subset of the multidimensional array;
the system further computing a plurality of other likelihoods for other sources of the set of energy sources, where each other likelihood is further computed by repeating the constructing, receiving, automatically adjusting, and computing for one source of the other sources;
the system selecting an optimal energy source of the set of energy sources as a function of the first likelihood and of the other likelihoods; and
the system directing the power-switching device to route electrical power from the selected optimal energy source to an energy consumer's energy-consuming loads, where the switch is configured to respond to the directing, by routing the electrical power from the optimal energy source to the energy consumer's energy-consuming loads.

2. The system of claim 1, where a first model, of the computational subset of the multidimensional array, that is derived as a function of a first subset of the set of factors returns:
   a probability, as a function of the first subset, that the first energy source is the optimal energy source,
   a probability, as a function of the first subset, that the first energy source is not the optimal energy source, and
   an uncertainty in the two probabilities returned by the first model.

3. The system of claim 1, where the constructing comprises:
   the system identifying dependency relationships between pairs of models of the computational subset of the multidimensional array;
   the system building an adjacency matrix,
      where a row position and a column position of a first entry of the adjacency matrix identify respectively a first pair of models of computational subset of the multidimensional array, and where a nonzero value in the first entry indicates an existence of a first dependency relationship between the first pair of models.

4. The system of claim 3, where an absolute value of a nonzero value in the first entry indicates a degree of strength of the first dependency relationship.

5. The system of claim 1, where the received evidence comprises extrinsic data from which may be inferred a prediction of future behavior of a factor of the set of factors.

6. The system of claim 1, where the received evidence comprises a previous determination by the system about whether a prior selection by the system of an optimal energy source correctly selected a source that was later confirmed to be an optimal energy source at the time of the selection.

7. The system of claim 1, where the automatically adjusting comprises:
the system revising a relative contribution of each model of the computational subset of the multidimensional array by assigning weightings to the each model of the computational subset such that the weighted array of the six models of the computational subset more accurately represents real-world behavior of the parameters identified by the received evidence.

8. The system of claim 1, where the system selects the optimal energy source by comparing, for each source of the set of energy sources:
a positive probability, a negative probability, and uncertainties in the positive and negative probabilities,
where a particular source's positive probability is a probability that the particular source is the optimal energy source,
where the particular source's negative probability is a probability that the particular source is not the optimal energy source, and
where the particular source's positive and negative probabilities are computed as a function of all probabilities inferred from all six cognitive models comprised by an instance of the computational subset of the multidimensional array associated with the particular source.

9. The system of claim 1, further comprising:
the system, upon receiving additional empirical evidence, repeating the automatically adjusting, the computing a first likelihood, the further computing, and the selecting, wherein the repeated selecting selects a current optimal energy source of the set of energy sources as a further function of the additional empirical evidence.

10. A method for an intelligent energy switch, the method comprising:
a processor of a computer system constructing a multidimensional array of cognitive models for a first energy source of a set of energy sources,
where each model of the multidimensional array is constructed as a function of a corresponding subset of a set of factors that affect a cost-effectiveness of the first energy source,
where each model of the multidimensional array infers a probability that the first energy source is the optimal source based on the each model's corresponding subset of factors,
where the multidimensional array comprises instances of six classes of cognitive models:
a cognitive Energy model that infers a probability that the first energy source is the optimal source by identifying a unit price of energy produced by the first energy source,
a cognitive Operational Factor model that infers a probability that the first energy source is the optimal energy source by identifying environmental factors that affect an ability of the first source to operate properly,
a cognitive Energy-Demand/Energy-Forecast model that infers a probability that the first energy source is the optimal energy source by identifying the first energy source's ability to produce sufficient power to meet current and future energy requirements,
a cognitive Capex/Opex model that infers a probability that the first energy source is the optimal energy source by identifying capital expenditures and operational expenditures required by using energy supplied by the first source,
a cognitive Incentive model that infers a probability that the first energy source is the optimal energy source by identifying financial subsidies that allow the consumer to mitigate costs incurred by using energy supplied by the first energy source, and
a cognitive Renormalization model that facilitates normalization of results of matrix computations performed on the multidimensional array, and
where each model of the cognitive models employs fuzzy logic to assign dynamic probabilities of accuracy to the model's recommendations;
the system receiving empirical evidence that is capable of altering an effect of the set of factors upon the cost-effectiveness of the first energy source;
the system automatically adjusting, as a function of the received evidence, each model of a computational subset of the multidimensional array, where the computational subset consists of the six cognitive models;
the system computing a first likelihood that the first energy source is an optimal source of the set of energy sources,
where an optimal energy source is able to supply energy more cost-effectively than can any other source of the set of energy sources under current operating conditions, and
where the computing is performed as a function of all probabilities inferred by all six models of the computational subset of the multidimensional array;
the system further computing a plurality of other likelihoods for other sources of the set of energy sources, where each other likelihood is further computed by repeating the constructing, receiving, automatically adjusting, and computing for one source of the other sources;
the system selecting an optimal energy source of the set of energy sources as a function of the first likelihood and of the other likelihoods; and
the system directing the power-switching device to route electrical power from the selected optimal energy source to an energy consumer's energy-consuming loads, where the switch is configured to respond to the directing, by routing the electrical power from the optimal energy source to the energy consumer's energy-consuming loads.

11. The method of claim 10, where a first model, of the computational subset of the multidimensional array, that is derived as a function of a first subset of the set of factors returns:
a probability, as a function of the first subset, that the first energy source is the optimal energy source, a probability, as a function of the first subset, that the first energy source is not the optimal energy source, and an uncertainty in the two probabilities returned by the first model.

12. The method of claim 10, where the automatically adjusting comprises:

the processor revising a relative contribution of each model of the array of cognitive models by assigning weightings to the each model such that the weighted array of models more accurately represents real-world behavior of the parameters identified by the received evidence.

13. The method of claim 10, further comprising providing at least one support service for at least one of creating, integrating, hosting, maintaining, and deploying computer-readable program code in the computer system, wherein the computer-readable program code in combination with the computer system is configured to implement the constructing, the receiving, the automatically adjusting, the computing a first likelihood, the further computing, the selecting, and the directing.

14. A computer program product, comprising a computer-readable hardware storage device having a computer-readable program code stored therein, the program code configured to be executed by an intelligent energy-switching system comprising a processor, a memory coupled to the processor, an electronically controlled power-switching device, and a computer-readable hardware storage device coupled to the processor, the storage device containing program code configured to be run by the processor via the memory to implement a method for an intelligent energy switch, the method comprising:

the processor constructing a multidimensional array of cognitive models for a first energy source of a set of energy sources, where each model of the multidimensional array is constructed as a function of a corresponding subset of a set of factors that affect a cost-effectiveness of the first energy source, where each model of the multidimensional array infers a probability that the first energy source is the optimal source based on the each model's corresponding subset of factors, where the multidimensional array comprises instances of six classes of cognitive models:

a cognitive Energy model that infers a probability that the first energy source is the optimal source by identifying a unit price of energy produced by the first energy source, a cognitive Operational Factor model that infers a probability that the first energy source is the optimal energy source by identifying environmental factors that affect an ability of the first source to operate properly, a cognitive Energy-Demand/Energy-Forecast model that infers a probability that the first energy source is the optimal energy source by identifying the first energy source's ability to produce sufficient power to meet current and future energy requirements, a cognitive Capex/Opex model that infers a probability that the first energy source is the optimal energy source by identifying capital expenditures and operational expenditures required by using energy supplied by the first source, a cognitive Incentive model that infers a probability that the first energy source is the optimal energy source by identifying financial subsidies that allow the consumer to mitigate costs incurred by using energy supplied by the first energy source, and a cognitive Renormalization model that facilitates normalization of results of matrix computations performed on the multidimensional array, and where each model of the cognitive models employs fuzzy logic to assign dynamic probabilities of accuracy to the model's recommendations;

the system receiving empirical evidence that is capable of altering an effect of the set of factors upon the cost-effectiveness of the first energy source;

the system automatically adjusting, as a function of the received evidence, each model of a computational subset of the multidimensional array, where the computational subset consists of the six cognitive models;

the system computing a first likelihood that the first energy source is an optimal source of the set of energy sources, where an optimal energy source is able to supply energy more cost-effectively than can any other source of the set of energy sources under current operating conditions, and where the computing is performed as a function of all probabilities inferred by all six models of the computational subset of the multidimensional array;

the system further computing a plurality of other likelihoods for other sources of the set of energy sources, where each other likelihood is further computed by repeating the constructing, receiving, automatically adjusting, and computing for one source of the other sources;

the system selecting an optimal energy source of the set of energy sources as a function of the first likelihood and of the other likelihoods; and the system directing the power-switching device to route electrical power from the selected optimal energy source to an energy consumer's energy-consuming loads, where the switch is configured to respond to the directing, by routing the electrical power from the optimal energy source to the energy consumer's energy-consuming loads.

15. The computer program product of claim 14, where a first model, of the computational subset of the multidimensional array, that is derived as a function of a first subset of the set of factors returns:

a probability, as a function of the first subset, that the first energy source is the optimal energy source, a probability, as a function of the first subset, that the first energy source is not the optimal energy source, and an uncertainty in the two probabilities returned by the first model.

16. The computer program product of claim 14, where the received evidence comprises extrinsic data from which may be inferred a prediction of future behavior of a factor of the set of factors.

* * * * *